(12) United States Patent
Basiony

(10) Patent No.: US 12,527,900 B2
(45) Date of Patent: Jan. 20, 2026

(54) SORBENT BAGS

(71) Applicant: Mohamed A Basiony, Kenmore, WA (US)

(72) Inventor: Mohamed A Basiony, Kenmore, WA (US)

(*) Notice: Subject to any disclaimer, the term of this patent is extended or adjusted under 35 U.S.C. 154(b) by 715 days.

(21) Appl. No.: 17/877,981

(22) Filed: Jul. 31, 2022

(65) Prior Publication Data

US 2023/0053271 A1 Feb. 16, 2023

Related U.S. Application Data

(60) Provisional application No. 63/231,563, filed on Aug. 10, 2021.

(51) Int. Cl.
*A61M 1/16* (2006.01)
*B01J 20/02* (2006.01)
*B01J 20/28* (2006.01)

(52) U.S. Cl.
CPC ........ *A61M 1/1696* (2013.01); *B01J 20/0211* (2013.01); *B01J 20/28052* (2013.01)

(58) Field of Classification Search
CPC ................ A61M 1/1696; B01J 20/0211; B01J 20/28052
USPC .......................................................... 210/675
See application file for complete search history.

(56) References Cited

U.S. PATENT DOCUMENTS 9,884,145 B2 * 2/2018 Pudil .................. B01D 15/1871
10,286,380 B2 * 5/2019 Gerber ................ A61M 1/1696

OTHER PUBLICATIONS

Nih.gov, Peritoneal Dialysis, https://www.niddk.nih.gov/health-information/kidney-disease/kidney-failure/peritoneal-dialysis (Year: 2018).*
UCLA.edu, How to Use the Separatory Funnel, https://www.chem.ucla.edu/~bacher/General/30BL/tips/Sepfunnel.html (Year: 2016).*
Universal Medical, https://www.universalmedicalinc.com/stainless-steel-5-leg-iv-pole-with-8-hook-rake-top.html?srsltid=AfmBOoqTs6uoijQSfj5Z3bHbrcw0MCV_Oo0NoX3YxdslMv7dxbWIVd9 (Year: 2016).*
U.S. Pat. No. 9,884,145-B2, Pudil; Bryant J., Google Patents.*

* cited by examiner

*Primary Examiner* — In Suk C Bullock

(57) ABSTRACT

This disclosure relates to sorbent bags that is used in the purification and regeneration of a dialysis solution. Each sorbent bag comprises a sorbent material in a reinforced plastic sealed portion with luer extensions and clamps to facilitate the inlet and outlet of the dialysate solution and to facilitate the mechanism of operation. Furthermore, each sorbent bag has recharge/reactivation line with luer and a vent line. The recharge/reactivation line with luer is located at the inlet line of the sorbent bag at its distal portion before a porous portion. While a vent line is located at the outlet line of the sorbent bag after a second porous portion. Each sorbent bag has shape that is gradually increased in diameter until a diameter "D" and then gradually decreased in diameter through the remaining length of the bag in the direction of the fluid flow.

9 Claims, 3 Drawing Sheets

SORBENT BAGS

CROSS-REFERENCE TO RELATED APPLICATION

This application is a continuation application of provisional application No. 63/231,563 filed on Aug. 10, 2021 and provisional application No. 62/956,638 filed on Jan. 2, 2020 now abandoned.

BACKGROUND

Dialysis refers to a clinical purification of blood and is used to replace kidney function for patients suffering from a renal dysfunction or failure.

The purification is typically done by contacting a biological fluid, such as blood, with a purifying liquid such as a dialysate, through a semipermeable membrane. In this purification process, extra water, electrolytes and waste toxins are removed from the patient's body.

A sorbent based regenerative dialysis, is a process that recycles a dialysate fluid (spent dialysate) after it has been used to purify a biological fluid and replaces desired substances to produce a "fresh dialysate", which is then re-contacted again with the biological fluid to continue the dialysis process. A sorbent system uses a sorbent cartridge which acts as a water purifier and a mean to regenerate a "spent dialysate" into a "fresh dialysate".

The drawbacks of known sorbent cartridges are: their high cost due to their expensive sorbent materials; they are formed into a single housing design; no customized use based on each patient's need, condition and volume or size; no recharge part or all sorbent cartridges' layers and no ease of manufacturing.

U.S. Pat. No. 10,286,380 describes a "sorbent pouch" that can be shaped to be adapted into an internal cavity defined by a sorbent cartridge in which the sorbent pouch is housed. Said "sorbent pouch" can have a porous structure to allow fluid to pass through but will not allow the sorbent material contained within the sorbent pouch to pass out of it.

There is a need for a new design of sorbent system that does not based on a sorbent cartridge concept to facilitate manufacturing process, customized use, recharging some or all components and to facilitate reuse of some components.

Also, there is a need for a new design that keeps sorbent materials separated from each other to give the operator the chance to replace any specific layer during the treatment without discarding all the layers (discarding the entire cartridge as with prior art).

Also, there is a need for a new design to give the operator the chance to interchange any sorbent layer during the operation and also to give the operator the chance to change layers' arrangement (from dialysate inlet to dialysate outlet) during the operation.

Also, there is a need for a new design that allows for each sorbent layer to have recharge/regeneration facility and vent facility (for gases that may generate during the operation) to be done during the operation.

Also, there is a need for a new design to allow the usage of different sorbent layers with respect to their sizes, shapes, volumes, weights, densities, etc.

Furthermore, there is a need for a new design to customize a patient's sorbent layers based on his/her need, condition, volume or size.

SUMMARY

The first aspect of the invention relates to sorbent bags, each sorbent bag comprises one sorbent material in a rein- forced plastic bag to accommodate excess pressures with luer extensions and clamps to facilitate the inlet and outlet of a spent dialysate and/or a biological fluid.

In any implementation of the first aspect of the invention, each sorbent bag comprises a recharge/reactivation line to facilitate recharge/reactivation process of the sorbent material and a vent line for gases that may generate during the operation.

In any implementation of the first aspect of the invention, each sorbent bag comprises a female luer and a male luer to facilitate connection and dis-connection with other bags during set-up and operation.

In any implementation of the first aspect of the invention, each sorbent bag comprises holes that are used to hang a bag on a hanger that has a ring to be used to hang the hanger on a stand-alone IV pole or on a dialysis machine's IV pole during set-up and operation.

In any implementation of the first aspect of the invention, each sorbent bag comprises a porous material at a dialysate and/or a biological fluid's inlet and outlet to allow for a dialysate and/or a biological fluid to pass through the sorbent material and retain it in the sorbent bag.

The second aspect of the invention is directed to sorbent bags. In any implementation of the second aspect of the invention, the sorbent bags contain sorbent materials that are used to purify, adsorption, catalysis and ion exchange different types of fluids such as a dialysate fluid.

In any implementation of the second aspect of the invention, the sorbent bags contain sorbent materials selected from an activated carbon, a urase, a zirconium phosphate, a zirconium oxide and sodium zirconium carbonate. The concept described here is not limited to those materials as the feature of the invention is the possibility to add more bags with different materials, sizes and volumes and to remove any bags during the operation.

Further feature is to provide sorbent bags that can be arranged in different configurations with respect to sorbent materials and with the possibility to re-arrange them during the operation.

Further feature, the sorbent bags can be connected in series or parallel to each other. Furthermore, the sorbent bags can be arranged with some bags in parallel to each other and some bags in series to each other or any arrangement of series and parallel bags.

Further feature, some of the sorbent bags can be reused to cut the cost.

Further feature is to provide sorbent bags with the same sizes, shapes, volumes and weights or densities that can be arranged together. Furthermore, is to provide sorbent bags with different sizes, shapes, volumes and weights or densities to be arranged together. These arrangements are based on each patient's need, condition and volume or size.

Further feature is to provide sorbent bags with different configurations and materials that can be used in any separation process which may require the removal of a fluid, or impurity that is passable through the materials of the sorbent bags.

Further feature is to provide sorbent bags with different configurations and materials that can be used to remove undesirable contaminants or overdose drug from patients' systems.

Further feature is to provide sorbent bags with different configurations and materials that can be used with a pediatric dialysis (mini-sorbent bags).

Further feature is to provide sorbent bags that are useful in the purification and/or regeneration of a dialysis solution that is used in a hemodialysis, a hemofiltration, a hemodiafiltration, a peritoneal dialysis and in any other treatments that are apparent to those of ordinary skill in the art

BRIEF DESCRIPTION OF THE DRAWINGS

The accompanying drawings, which are incorporated in, and constitute a part of the specification, illustrate or exemplify embodiment of the present implementation and, together with the description, generally explain the principles and features of the present implementation. The drawings are briefly described as follows.

DETAILED DESCRIPTION

The following detailed description illustrates the principal of the disclosure by way of example not by way of limitation. While a reference use of the present disclosure describes sorbent bags that are used for purification and/or regeneration of a dialysis solution that is used in a hemodialysis, a hemofiltration, a hemodiafiltration and a peritoneal dialysis, the principal of the present disclosure can be used on other types of treatments without modification in a manner which will be apparent to one of ordinary skill in the art. Consequently, the scope of the implementation is not to be limited by the field to which the implementation is applied.

Figure 1:
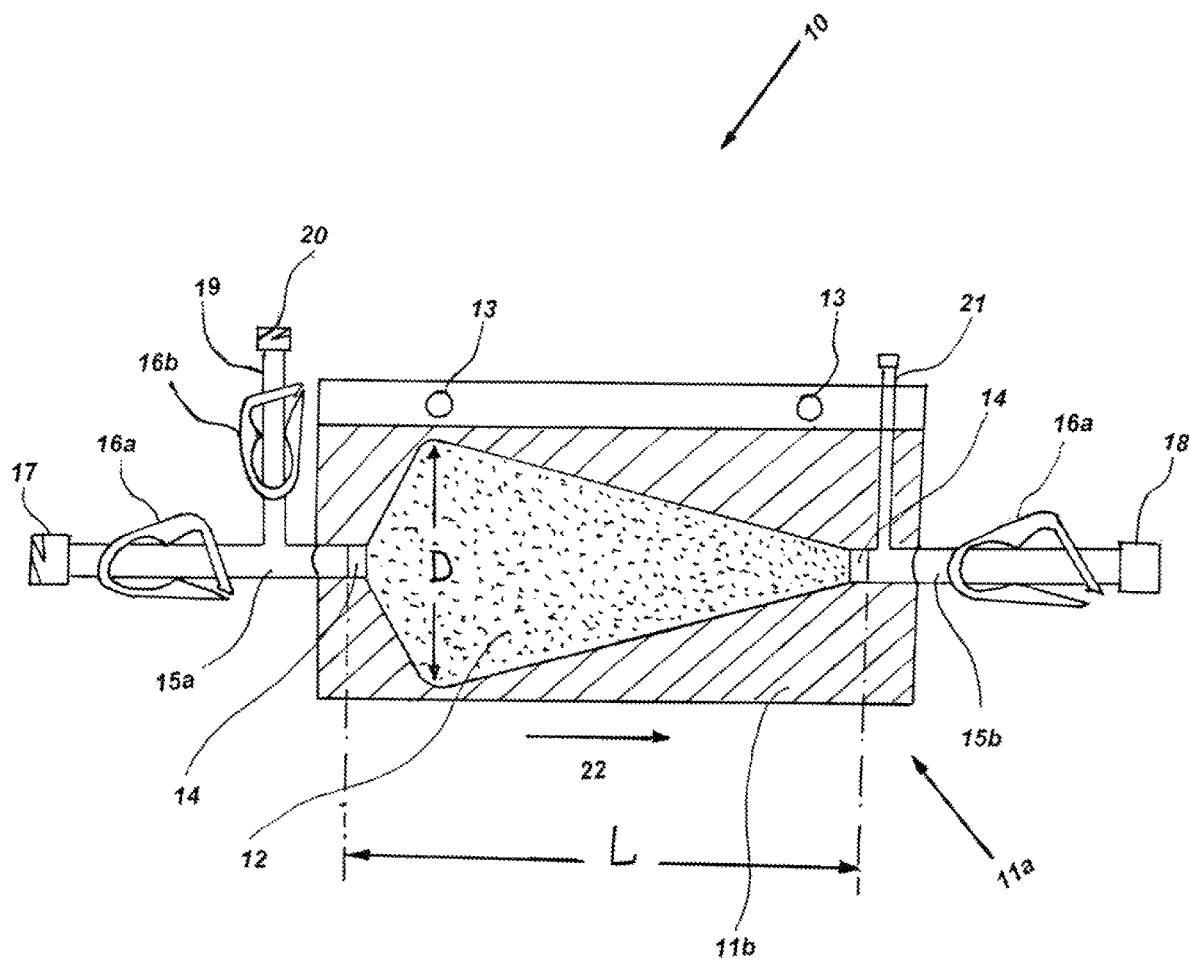
FIG. 1 is a perspective view of the components of one sorbent bag.

Now referring to FIG. 1, it illustrates the components of one reinforced plastic bag 10, wherein a bag 11a with a reinforced sealed portion 11b that accommodates excess pressures that may be built during the operation, a sorbent material 12, holes 13, porous portions 14a and 14b, luer extension 15a, luer extension 15b, clamps 16a, clamp 16b, female luer 17, male luer 18, recharge/reactivation line 19 with luer 20 and a vent line 21. The recharge/reactivation line 19 with luer 20 is located at the inlet line of the bag 10 represented by a first luer extension 15a and at its distal portion before a porous portion 14a as in FIG. 1. While a vent line 21 is located at the outlet line of the bag 10 represented by a second luer extension 15b after a porous portion 14b as in FIG. 1. In another implementation, recharge/reactivation line 19 and a vent line 21 are located in different locations.

The bag 11a is formed with a shape that is gradually increased in diameter until a diameter "D" which may located at 5-10 percentage of the total length "L" FIG. 1 (or any suitable percentage) and then gradually decreased in diameter through the remaining of "L" length in the direction of a fluid flow as per arrow 22, this preferred configuration for better flow. Furthermore, bag 11a, may have a cylindrical shape, rectangular shape or any other suitable shapes. The material of bag 11a is a medical grade plastic or any suitable polymer.

Sorbent bag 11a is made with different shapes, sizes, diameters "D", lengths "L", with the possibility to build up mini-sorbent bags for a pediatric use.

Furthermore, a sorbet bag 11a comprises a sorbet material 12 that can differ from one bag to another with respect to the type of material, size/shape of particles, density of particles, etc. The sorbent materials can be selected from an activated carbon, a urase, a zirconium phosphate, a zirconium oxide and sodium zirconium carbonate. The concept described here is not limited to those materials, as the materials are selected based on each patient's need, condition, volume or size, etc.

The recharge/reactivation line 19 with a clamp 16b and luer 20 is used to recharge/reactivate a sorbent material 12 whenever is required and in this case clamp 16b is opened, otherwise, clamp 16b is closed. While the vent line 20 is used to vent gases that may generate during the operation.

Figure 2:
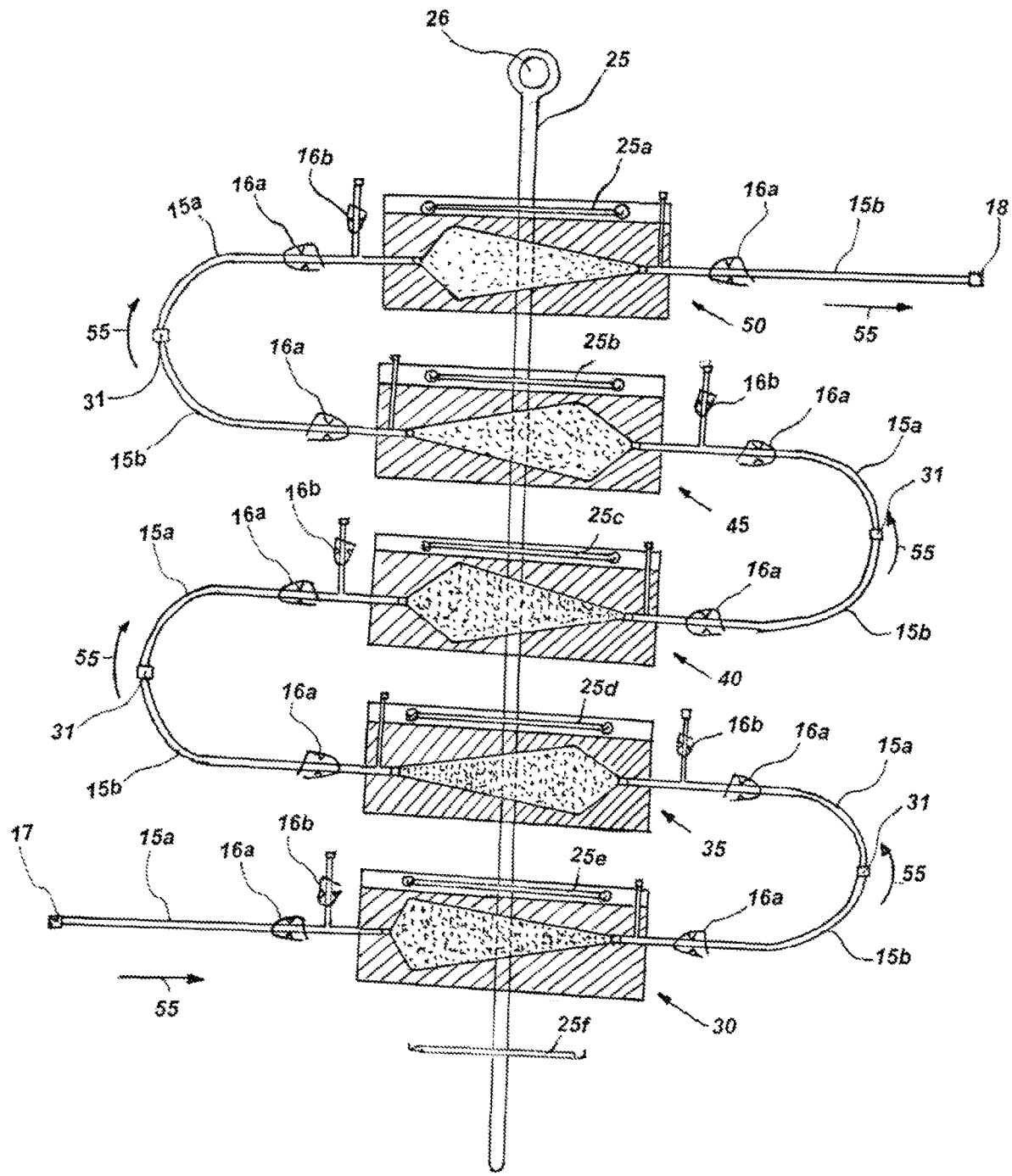
FIG. 2 is a perspective view of sorbent bags connected to each other during set-up and operation.

Luer extension 15a with female luer 17 and luer extension 16b with male luer 18 are used to connect each bag to another via connecting a female luer 17 to male luer 18 as in FIG. 2. During operation, clamps 16a are opened. While, clamps 16a are closed during the replacement or rearrange or reconfigure the bags during the set-up and operation.

Porous portions 14a and 14b are used to allow a spent dialysate or a biological fluid to pass through the sorbent material 12 while retaining the sorbent material 12 inside the sorbent bag 11a. Also, porous portions 14a and 14b are made of a dacron material, a cotton, or any suitable material. Furthermore, a porous portion 14a is located at the inlet of a spent dialysate or a biological fluid at the distal end of luer extension 15a. While a porous portion 14b is located at the outlet of a fresh dialysate or a biological fluid (after it has been treated by the sorbent bags) at the distal end of luer extension 15b.

Holes 13 are used to hang a sorbent bag to a hanger 25 as in FIG. 2.

Now referring to FIG. 2, it illustrates the sorbent bags connected to each other during set-up and operation. As in set-up and operation, the selected sorbent bags can be hanged on a hanger 25 using portions with hocks 25a, 25b, 25c, 25d, 25e with extra portions of hocks such as 25f that is used in case the user needs to add more sorbent bags. The hanger 25 has a ring 26 that is used in turn to hang the bags to a stand-alone IV pole (not shown for simplicity) or to a dialysis machine's IV pole (also, not shown for simplicity).

Also in FIG. 2, sorbent bag(1) 30 with a sorbent material (1) is connected to sorbent bag(2) 35 with a sorbent material (2) which in turn is connected to a sorbent bag(3) 40 with a sorbent material (3), which in turn is connected to a sorbent bag(4) 45 with a sorbent material (4) and then is connected to a sorbent bag(5) 50 with a sorbent material (5).

Each bag is connected to another bag via connecting a female luer 17 to a male luer 18 to create a connector 31. Sorbent bag(1) 30 still has the luer extension 15a with female luer 17 to be used as an inlet for a spent dialysate or a biological fluid (to be connected to an inlet source of a spent dialysate or a biological fluid that is not shown for simplicity), while sorbent bag(5) still has the luer extension 15b with male luer 18 that is used as an outlet for a fresh dialysate or a fresh biological fluid (to be used during a patient's treatment that is not shown for simplicity). The direction of a dialysate or a biological fluid flow is represented by arrows 55.

Due to the flexibility of configurations, arrangement and materials, the sorbent bags; (1) 30, (2) 35, (3) 40, (4) 45 and (5) 50 can be used for purification/regeneration of a dialysis solution that is used for hemodialysis, peritoneal dialysis and in any other treatments. Furthermore, the sorbent bags; (1) 30, (2) 35, (3) 40, (4) 45 and (5) 50 can be used to remove undesirable contaminants or overdose drug from patients' systems.

During operation, clamps 16a are opened, while clamps 16b are closed which in turn are opened during recharge/reactivation process to be connected to recharge/reactivation source (not shown for simplicity). In case the operator needs to replace or interchange or re-arrange sorbent bag(2) 35 as an example, they need to close its clamps 16*a* and 16*b* and also the clamps 16*a* and 16*b* of sorbent bag(1) 30 and sorbent bag(3) 40 and then disconnect its female luer from male luer of sorbent bag(1) 30 and doing the same, disconnect its male luer from female luer of sorbent bag(3) 40.

Also, in case of re-use any of the bags, it is disconnected by the same above way to be re-used to reduce the cost.

Figure 3:
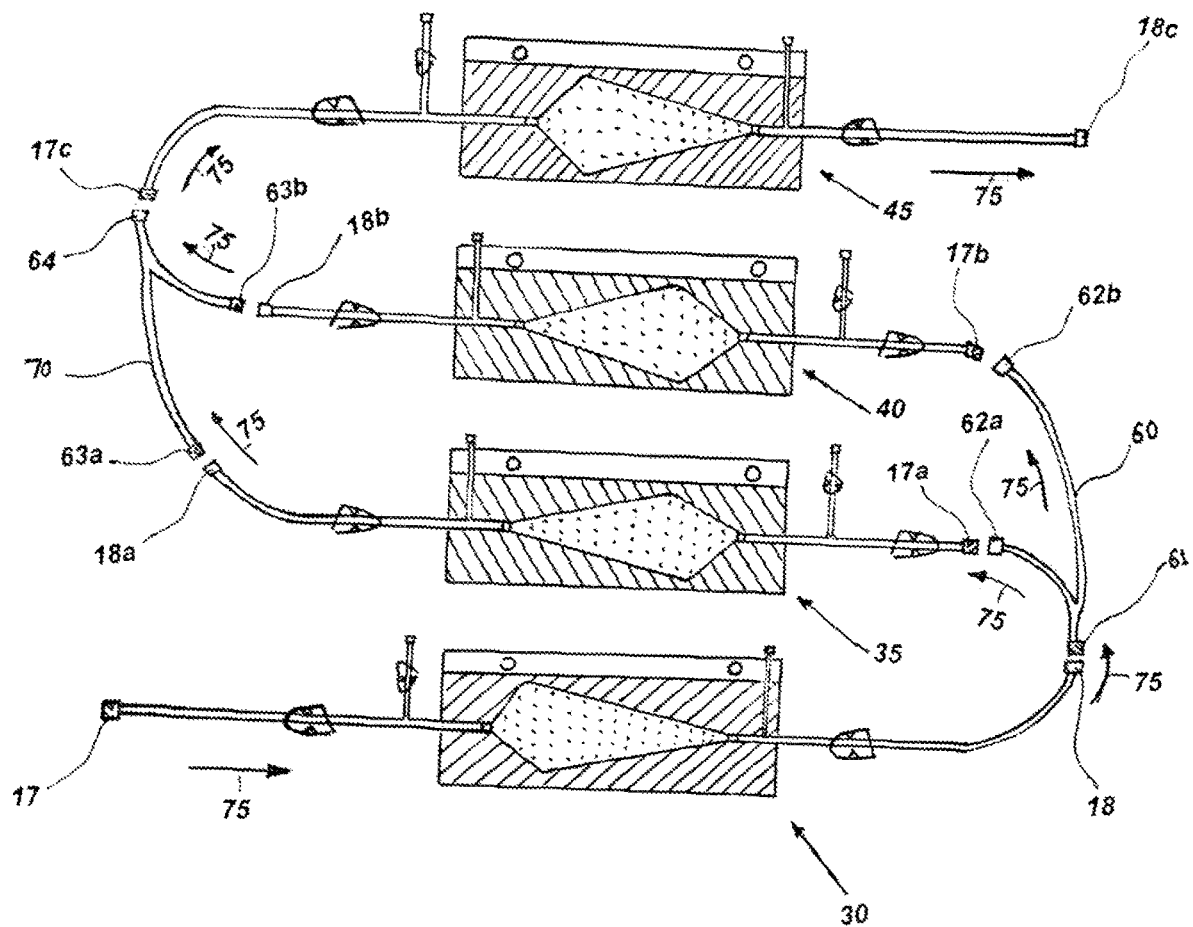
FIG. 3 is a perspective view of series and parallel connections of sorbent bags.

Also as an example, during operation as in FIG. 3, sorbent bag(1) 30 is connected in series to both sorbent bags(2) 35 and sorbent bag(3) 40 (that are parallel to each other) via connecting male luer 18 of sorbent bag(1) 30 to an extension line 60 with a female luer 61 and two male lures 62*a* and 62*b* which in turn are connected to a female luer 17*a* of sorbent bag(2) 35 and female luer 17*b* of sorbent bag(3) 40.

Then, male luer 18*a* of sorbent bag(2) 35 and male luer 18*b* of sorbent bag(3) 40 are connected to another extension line 70 via its female luer 63*a* and female luer 63*b*, while its male luer 64 is connect in series with a female luer 17*c* of a sorbent bag(4) 45. Then, female luer 17 of sorbent bag(1) 30 is used as an inlet for a spent dialysate or a biological fluid, while male luer 18*c* of sorbent bag(4) 45 is used as an outlet for a fresh dialysate or a fresh biological fluid. Arrows 75 represent a fluid flow direction. This example illustrates the flexibility of the invention.

The invention claimed is:

1. A first sorbent bag comprising:
a reinforced sealed portion enclosing a sorbent material;
wherein the sorbent bag has a longitudinal shape that gradually increases in diameter to a maximum diameter 3 cm to 7 cm located at a position along a total length of 8 cm to 12 cm, and then gradually decreases in diameter in a direction of fluid flow;
a first luer extension and a second luer extension, each coupled to the first sorbent bag and having respective male and female luer fittings;
a first porous portion positioned at an inlet of the first sorbent bag, and a second porous portion positioned at an outlet of the sorbent bag, wherein the porous portions permit fluid to pass through while retaining the sorbent material;
a recharge/reactivation line with a luer fitting in fluid communication with the inlet and positioned proximal to the first porous portion; and
a vent line in fluid communication with the outlet and positioned distal to the second porous portion; and
wherein the first sorbent bag further comprises at least one clamp operatively associated with each of the first luer extension and the second luer extension and vent line.

2. The first sorbent bag of claim 1, wherein the sorbent material is selected from a group containing an activated carbon, a urase, a zirconium phosphate, a zirconium oxide, or sodium zirconium carbonate wherein selection is based on a patient's need, condition, volume, or size.

3. The first sorbent bag of claim 1 wherein the recharge/reactivation line with luer is located at the inlet of the sorbent bag represented by the luer extension and at its distal portion before the first porous portion.

4. The first sorbent bags of claim 1 wherein the vent line is located at an outlet line of the sorbent bag represented by the luer extension after the second porous portion.

5. The first sorbent bags of claim 1 wherein the sorbent bags can be connected together in series and/or parallel and/or combination of series and parallel using the male and female lures.

6. The first sorbent bag of claim 1 wherein the first porous portion is located at the inlet of a spent dialysate at a distal end of the first luer extension and at the outlet of a fresh dialysate after it has been treated at a distal end of the second luer extension.

7. A method comprising:
connecting the first sorbent bag of claim 1 to a second sorbent bag via connecting a male luer of one sorbent bag to a female luer of another sorbent bag;
connecting a female luer of the first sorbent bag in a direction of a fluid flow to an inlet line of a spent dialysate;
connecting a male luer of last the second sorbent bag in the direction of a fluid flow to an outlet line of a fresh dialysate after it has been treated;
hanging the first sorbent bag and second sorbent bag on a hanger using portions with hooks; and
using a ring to hanging the sorbent bags on an IV pole.

8. The method of claim 7 wherein during recharge/reactivation process the luer of recharge/reactivation line is connected to a recharge/reactivation source with a clamp of said recharge/reactivation line is opened.

9. The method of claim 7 wherein replacing or interchanging or re-arranging the sorbent bags can be done by closing the clamps of the sorbent bags then disconnect the female lures from the male lures.

\* \* \* \* \*